(12) United States Patent
Crossfield et al.

(10) Patent No.: US 6,204,766 B1
(45) Date of Patent: Mar. 20, 2001

(54) MULTI-LAYER MAGNETIC TAG

(75) Inventors: Michael David Crossfield, West Wickham; Christopher John Coggill, West Wratting, both of (GB)

(73) Assignee: Flying Null Limited, Harston (GB)

( * ) Notice: Subject to any disclaimer, the term of this patent is extended or adjusted under 35 U.S.C. 154(b) by 0 days.

(21) Appl. No.: 09/269,350

(22) PCT Filed: Sep. 29, 1997

(86) PCT No.: PCT/GB97/02690

§ 371 Date: May 21, 1999

§ 102(e) Date: May 21, 1999

(87) PCT Pub. No.: WO98/13708

PCT Pub. Date: Apr. 2, 1998

(30) Foreign Application Priority Data

Sep. 27, 1996 (GB) .................................................. 9620190

(51) Int. Cl.[7] .................................................. G08B 13/14
(52) U.S. Cl. ...................................................... 340/572.6
(58) Field of Search ............................ 340/572.1, 572.2, 340/572.3, 572.6, 551

(56) References Cited

U.S. PATENT DOCUMENTS

| | | | |
|---|---|---|---|
| 4,779,076 | * 10/1988 | Weaver | 340/572.6 |
| 4,935,724 | * 6/1990 | Smith | 340/572.6 |
| 5,554,974 | * 9/1996 | Brady et al. | 340/572.6 |
| 5,580,664 | * 12/1996 | Tsai | 340/572.6 |
| 5,582,924 | * 12/1996 | Davies | 340/572.6 |
| 5,643,686 | 7/1997 | Isshiki et al. . | |
| 5,821,859 | * 10/1998 | Schrott et al. | 340/572.6 |
| 5,909,177 | * 6/1999 | Rührig | 340/572.6 |

FOREIGN PATENT DOCUMENTS

| | | |
|---|---|---|
| 3075820 | 7/1989 | (EP) . |
| 2312595 | 4/1997 | (GB) . |
| 6273144 | 10/1994 | (JP) . |
| 9600367 | 2/1996 | (WO) . |
| 9600823 | 4/1996 | (WO) . |

* cited by examiner

Primary Examiner—Jeffery A. Hofsass
Assistant Examiner—John Tweel, Jr.
(74) Attorney, Agent, or Firm—Oppenheimer Wolff & Donnelly LLP

(57) ABSTRACT

A magnetic marker or tag is disclosed which comprises (a) a first magnetic material characterised by high permeability, low coercivity and a non-linear B-H characteristic; and (b) a second magnetic material which is capable of being permanently magnetised, said first and second magnetic materials being superimposed one on the other and advantageously being substantially coterminous. The second magnetic material is preferably of medium coercivity. Selected regions of said second magnetic material can carry magnetisation such as to magnetically divide the first magnetic material into a series of magnetically discrete zones, the length of said magnetically discrete zones and/or the lengths of said magnetised regions ("gaps") of said second material constituting elements of a code.

13 Claims, 1 Drawing Sheet

Example of recorded pattern to magnetically partition 45mm strip tag into 4 active segments

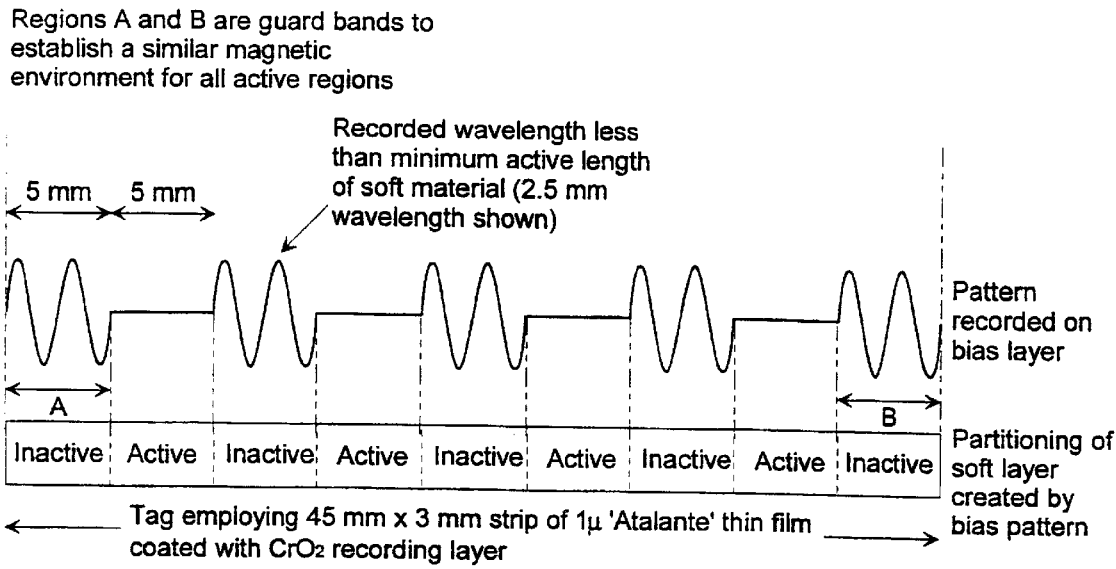
Fig 1: Example of recorded pattern to magnetically partition 45mm strip tag into 4 active segments
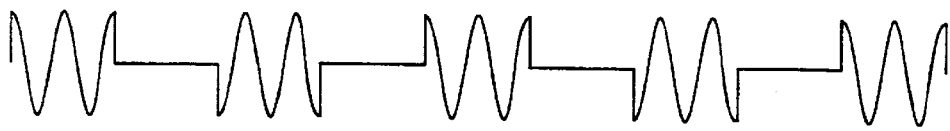
Fig 2: Example of practical pattern with improved definition of ends of active material segments
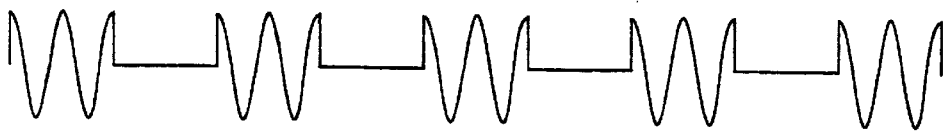
Fig 3: Alternative to pattern of Fig 2 with reduced field variation over active segments

MULTI-LAYER MAGNETIC TAG

BACKGROUND TO THE INVENTION

This invention relates to magnetic tags and, more particularly but not exclusively, is concerned with tags which can be encoded with data.

In previous patent applications, notably in WO96/31790 and WO97/04338, we have described remote identification tags which may be interrogated using alternating and/or static magnetic fields. In response to interrogation the tags emit magnetic signals which may be detected in suitable receiving equipment. Such tags have many applications in areas such as article identification, security and access control.

Certain of the tags described in WO96/31790 contain elements of high permeability, low coercivity, "soft" magnetic alloy in the form of a strip, wire or thin film, overlaid with a medium coercivity magnetic layer. The magnetic signal or "signature" generated by the high permeability element in response to interrogation is determined by the magnetisation pattern stored in the medium coercivity "coding" layer, and the characteristics of the high permeability element.

In practical implementations tag coding can for example be carried out during tag manufacture by contact- or near contact-recording the appropriate magnetic pattern onto a continuous coding layer using an array of permanent magnets. This method is particularly suitable for producing many tags with the same code.

Another method, which is suitable for manufacturing tags whose code will never require change, is to place suitably-magnetised pieces of coding material at appropriate positions on the high permeability material.

Yet another method is to place un-magnetised pieces of medium coercivity material in an appropriate pattern using e.g. a thermal transfer process, and then to bulk-magnetise the entire structure.

A very convenient arrangement uses a magnetic recording head of the type well-known for recording information onto magnetic tape. With this arrangement, tags manufactured with a uniform un-magnetised coding layer can have patterns individually coded at the point-of-issue. This is extremely useful for applications such as airline baggage tagging, where individual tag details (passenger name etc.) are not known in advance of issue.

WO97/04338 discloses a magnetic marker or tag, which comprises (a) a first magnetic material characterised by high permeability, low coercivity and a non-linear B-H characteristic; and (b) a second magnetic material which is capable of being permanently magnetised, characterised in that said second magnetic material is magnetised with a non-uniform field pattern.

U.S. Pat. No. 5,643,686 (D1) discloses the use of a fixed permanent magnetic pattern for identifying a magnetic recording medium. With this system, a high degree of security against forgery is obtained. The magnetic medium comprises a non-magnetic substrate which supports at least two magnetic layers one of which contains dispersed magnetic particles having a coercivity of 4000 oersted or less and has a non-rewritable fixed signal recorded into the layers. This is achieved by magnetically orienting the dispersed particles during manufacture of the layered material while the particle dispersion is still wet. The orienting magnetic field is active until the layer has become solid, whereupon the dispersed particles have acquired the desired non-erasable magnetic pattern.

EP 0353040-A (D2) discloses the application of the so-called "Watermark"-type magnetic material to a soft magnetic EAS (electronic article surveillance) tag. The "Watermark" material comprises magnetic particles orientated into alternating directions differing in phase by 90 degrees within adjacent regions. In its initial state, the "Watermark" material, although structured during manufacture, is unmagnetised. It thus has no effect upon the soft magnetic material in the EAS tag, and the tag can be detected by conventional a.c. interrogation (e.g. as commonly used at detection gates in stores). To prevent detection of the tag, it is wiped, at the point of sale, with a permanent magnet. This causes alternate regions of the "Watermark" layer to become magnetised; these regions then exert a uniform magnetic bias which magnetically clamps adjacent regions of the soft magnetic material, thereby magnetically dividing the material into regions too small to generate an alarm signal when interrogated by an a.c. detection system. There is no magnetic pattern within the magnetised regions—just a uniform magnetisation.

BRIEF DESCRIPTION OF THE DRAWINGS

FIG. 1 shows an example of a recorded pattern to magnetically partition a strip tag into active segments.

FIG. 2 shows an example of a practical pattern with improved definition of ends of material segments.

FIG. 3 is an alternative to the pattern of FIG. 2 with reduced field variation.

SUMMARY OF THE INVENTION

The present application relates to magnetic tags whose construction is such that, by means of relatively simple magnetic recording, it is possible to generate recorded patterns in parts of the tag which are such as to isolate areas of a tag (made from a continuous layer of soft magnetic material) such that the areas behave magnetically as if they were physically separate. It also describes how data may be encoded into such a tag using variations in size and/or spacing of the isolated regions.

More particularly, according to one aspect of the present invention, there is provided a magnetic marker or tag which comprises (a) a first magnetic material characterised by high permeability, low coercivity and a non-linear B-H characteristic; and (b) a second magnetic material which is capable of being permanently magnetised by conventional magnetic recording techniques, said first and second magnetic materials being superimposed one on the other, wherein selected regions of said second magnetic material are magnetised to carry magnetisation in the form of an erasable pattern of repeatedly reversing polarity, said magnetisation being such as to couple magnetically with contiguous regions of said first magnetic material so as to magnetically divide the first magnetic material into a series of magnetically discrete zones, the length of said magnetically discrete zones and/or the lengths of said magnetised regions ("gaps") of said second material constituting elements of a code.

Unlike D1, the tags of this invention are designed to adopt a coding scheme which requires the magnetisation of regions of the second magnetic material. It is inconceivable to incorporate such magnetisation into the material during the manufacture of the tag; this would render the manufacture so costly as to make the process unviable. In contrast to D1, therefore, the second magnetic material used in a tag of this invention is capable of being permanently magnetised by conventional magnetic recording techniques, and is preferably a conventional magnetic recording medium. The magnetic pattern applied to the material is thus erasable and is therefore remote from the non-rewritable magnetic security code which is the essence of the dislcosure in D1.

Similarly, tags of the present invention differ essentially from those of D2 in that they do not possess a pre-formed distribution of magnetic particles into alternating zones whose alignment differs in phase by 90 degrees. Such a pre-formed orientation results in a binary response when the material is wiped longitudinally with a permanent magnet; each zone is either magnetised or not by this action. Consequently it is not possible, with such a medium, to incorporate an erasable pattern of repeatedly reversing polarity over any chosen length of the material.

These distinctions are to be expected given that D1 and D2 are directed towards the enhancement of security whereas the present invention is concerned with tags which can be magnetically coded to carry information.

Advantageously, the two magnetic materials are substantially coterminous. Such a tag can be encoded with information by magnetising selected regions of the second magnetic material; the magnetised regions nullify the properties of the first magnetic material with which they are in contact, thereby effectively dividing the soft (first) magnetic material into a series of magnetically discrete zones even though in physical terms the material is continuous. For convenience, magnetised regions of the second magnetic material are referred to herein as "gaps" since they serve to synthesise magnetic gaps in the first magnetic material with which they are in contact.

Preferably, the second magnetic material is a material of medium coercivity.

As will be explained below, the preferred nature of the magnetisation depends upon the physical size of the gap.

The magnetically discrete zones of said first magnetic material ("active regions") and the lengths of said magnetised regions ("gaps") of said second material constituting elements of a code can be thought of as "magnetic codons" since they are used in the invention to generate coded information in the tag. A suitable encryption key is required for writing and/or reading the information; this is preferably as simple as possible, and can in any event be achieved by conventional means. A simple encryption system is described, by way of example, later in this document.

In one embodiment, the lengths of the magnetically discrete zones in said first magnetic material ("active regions") are constant whereas the lengths of the magnetised regions ("gaps") of said second material are varied to provide encoding of data. Other arrangements—e.g. using different lengths for the active regions as well as, or instead of, different lengths for the gaps—may be adopted if desired.

The invention is thus able to provide magnetically recorded patterns on a tag made from a layer of soft magnetic material overlaid by a layer of medium coercivity magnetic material.

Numerous materials are commercially available which can be satisfactorily used in this invention. For example, one suitable material for use as the first, soft magnetic material is the thin-film material supplied by IST of Belgium under the trade name "Atalante". This is a sputtered amorphous alloy with a thickness of about 1 μm supported on a PET backing. The film has a typical intrinsic permeability of $10^5$ and a low frequency coercivity of a few A/m.

Suitable coding materials—i.e. materials for use as the second magnetic material—are finely-divided ferromagnetic oxides with coercivities in the range 100 to 6000 oersted. Suitable materials are available commercially from many suppliers, e.g. BASF (Germany), Kurtz (Germany) and TDK (Japan), and are generally used for the manufacture of magnetic recording media.

The simplest format of multi-bit tag (also termed label) capable of being read by a Flying Null reader as described in WO96/31790 consists of an array of physically separate pieces of magnetic material, the information being encoded by the sizes of the metal elements and/or the gaps between them.

In such a design the minimum length of element which can be reliably detected is determined by the details of the reader, the intrinsic properties of the magnetic material, and the shape of the element. For example, for simple labels made from Atalante film thin, the critical length of 3 mm wide material for detection in a 2nd harmonic detector of the type described in GB 9506909.2 is currently around 5 mm. Lengths of half this dimension produce negligible output. This arises from the shape factor of the element, which reduces the extrinsic permeability of the material from about $10^5$ for an element of infinite length, to around 5000 for a 5 mm length, and to less than half this for a 2.5 mm length.

For labels made from a continuous layer of thin film, it is necessary to make the spaces between the regions where material is required to be detected appear to the reader to be magnetically inactive. This may be done by suitably-magnetising the recording layer overlaying these regions.

If the regions are short, i.e. less than half the minimum length for an active region, then it is sufficient to apply a simple uniform magnetisation over them in order to render them essentially inactive. Such a magnetisation would prevent the leading edge of the region from responding to interrogation by the null of the reading system at the same spatial point as the trailing edge of the immediately adjacent active region. Furthermore, we have found that when the null moves to a point where the net fields over the pre-magnetised region is zero, the length of the region would make the signal generated negligible.

However, for regions which are comparable with or greater than the minimum length for an active region, a simple uniform magnetisation is generally unsatisfactory. This is because a magnetised region will become active when the null of the reader is at a point where the net field over the region is zero, and at this point the region will generate a signal which may overlay that from an active region, and corrupt the intended signal.

A universally-suitable recorded pattern is generally a simple repetitive sequence which reverses in polarity with a spatial frequency such that North and South poles of the pattern are separated by, at most, half the minimum active length for the soft magnetic material. This ensures that the regions of material overlaid by the pattern are magnetically segregated into lengths incapable of generating a significant signal by virtue of their low effective permeability.

For labels made as described above and using 3 mm wide strips of Atalante film overlaid with a medium coercivity recording layer, the minimum length for an active segment is typically 5 mm. To render regions of any length inactive the spatial wavelength of the recorded pattern therefore needs to be less than around 5 mm, and preferably less than 2.5 mm.

For labels made from Vacuumschmeltze type 6025 amorphous strip 1 mm wide and 15 μm thick the minimum effective active element length in a reader such as described in PCT/GB96/00823 is around 10 mm, and the spatial wavelength of the recorded pattern needs to be less than 10 mm, and preferably less than 5 mm, for good attenuation of signals from the underlying region.

Such magnetisation patterns can be created using closely-spaced arrays of narrow permanent magnets. Another technique is to deposit the recording layer in segments which are narrower and more closely spaced than the critical dimensions described above, and then to magnetise them uniformly in those regions of the tag which are required to be inactive. Yet another alternative is to use a conventional contact magnetic recording process of the type widely used for recording information onto magnetic tape. Such processes can easily achieve spatial resolutions of a few $\mu$m, and thus by using such heads it is also easy to sharply define the end conditions on the inactive segments by adjusting the phase of the recorded signal. This can be useful in defining precise spatial end points of blocks. For example a sinusoidal bias pattern can be set to start and end at the 90 degree phase points of the sine wave, rather than zero phase, giving very rapid rise of field at the start and end of the segment which is intended to be inactive. It is also simple to programme patterns where the residual bias over the active regions caused by the fields from the ends of the magnetised region are either of uniform polarity, or reverse in polarity from one end to the other.

Examples of suitable patterns for the inactive regions of multi-bit data tags are indicated in the Figures below. In all cases the patterns include "guard bands" at each end. These inactive regions ensure that the active regions in a tag structure are all in similar local magnetic environments, improving consistency of segment lengths as measured by the reader system.

Exemplary Coding Schemes for Multi-bit Flying Null Tags

Tags constructed as described above are capable of being encoded with information using a variety of schemes. One of the simplest is described in one of our earlier applications. This uses the presence of an active region to denote a digital "1", and an inactive region to denote a digital "0", the spacing between regions being constant along the tag. Since inactive regions are, by definition, not detected by the tag reader it is also necessary to add active regions at both ends of the tag, to indicate to the reader when the data has started and ended. This enables the storage of a character by using a binary representation. For example, a decimal "6" could be represented by 11101, 110 being the binary representation of 6, and the leading and trailing "1"s indicating the start and end of the data. This scheme is very easy to apply, and particularly suitable for tags with only a few bits data capacity. For higher data capacity tags, however, this scheme is less attractive. A particular drawback is that as data words get longer, the codes can contain long runs of successive "0"s, and this causes problems in decoding. These problems include deciding when the end of a tag has been reached, and in accommodating signal width variations caused by variations in tag speed with motion relative to the reader.

Robust coding schemes for high capacity tags are those which do not generate long runs of successive "0"s and have inherent embedded tag speed information. It is also very convenient from an implementation viewpoint if tags of a given data capacity are all the same physical length.

A general approach which enables coding schemes which can meet all these criteria is based on encoding information by varying the lengths of the inactive regions (gaps) between fixed length active regions.

A practical example of one such coding scheme will now be described. In this scheme a character block is made up from 4 active regions and 3 inactive regions. The active regions are all of constant length, and the first and last are fixed in position. The positions of the middle two active regions are variable, and are defined by a scheme which assigns one of four possible lengths to each of the three inactive regions in the block, with the constraint that the total physical length of the block remains constant. A typical set of gap sizes is 1.5, 3.5, 5.5 and 7.5 mm, using 5 mm active regions, with the constraint that three gaps defining a character sum to 12.5 mm. This gives twelve possible variations, which can be related to characters as follows:

| GAP1 | GAP2 | GAP3 | CHARACTER |
|------|------|------|-----------|
| 1.5  | 3.5  | 7.5  | 0 |
| 1.5  | 5.5  | 5.5  | 1 |
| 1.5  | 7.5  | 3.5  | 2 |
| 3.5  | 1.5  | 7.5  | 3 |
| 3.5  | 3.5  | 5.5  | 4 |
| 7.5  | 3.5  | 1.5  | 5 |
| 5.5  | 5.5  | 1.5  | 6 |
| 3.5  | 7.5  | 1.5  | 7 |
| 7.5  | 1.5  | 3.5  | 8 |
| 5.5  | 3.5  | 3.5  | 9 |
| 3.5  | 5.5  | 3.5  | * |
| 5.5  | 1.5  | 5.5  | # |

The characters 0–4, when read in the reverse direction, correspond to the characters 5–9, while the * and # symbols are palindromes. Using this coding scheme, the reading direction of the tag can conveniently be determined by using the * or # as start or stop characters. For greater code security, a checksum character in modulo-5 format can be placed centrally in a number containing an even number of characters. This gives information both on the direction (because reverse values will read as 5–9) and the integrity of the data.

Information on the speed of the tag can be extracted by the tag reading apparatus by timing the occurrences of every third active region. These regions occur at character block spacings, and are preferably uniformly spaced every 27.5 mm along the tag.

Of course, other values of gaps sizes and active element lengths may be used, and the same principles can be applied to schemes with different numbers of gaps and gap size steps. For example, a simple extension to the scheme described is to create a fifth step size option of 9.5 mm. Still using a block containing 3 inactive regions, but now extended in total length from 27.5 mm to 29.5 mm, it can readily be shown that 18 unique characters (including 2 palindromes) can be coded. This extended scheme provides increased data capacity for a given overall tag length compared to the simpler scheme, at the expense of requiring data to be converted to a hexadecimal rather than decimal format.

It is also possible to use variations in the lengths of active elements instead of in the gap sizes to encode data in a generally analogous way, though this has to take account of the constraints on the minimum length for an active element discussed earlier. A coding arrangement which uses a combination of varying gap sizes and varying active region lengths is potentially efficient in terms of minimising overall tag length for a given data capacity.

What is claimed is:

1. A magnetic marker or tag which comprises (a) a first magnetic material characterised by high permeability, low coercivity and a non-linear B-H characteristic; and (b) a second magnetic material which is capable of being permanently magnetised by conventional magnetic recording techniques, said first and second magnetic materials being superimposed one on the other, characterised in that selected regions of said second magnetic material are magnetised to carry magnetisation in the form of an erasable pattern of repeatedly reversing polarity, said magnetisation being such as to couple magnetically with contiguous regions of said first magnetic material so as to magnetically divide the first magnetic material into a series of magnetically discrete zones, the length of said magnetically discrete zones and/or the lengths of said magnetised regions ("gaps") of said second material constituting elements of a code.

2. A tag as claimed in claim 1, characterised in that the two magnetic materials are substantially coterminous.

3. A tag as claimed in claim 1, characterised in that said second magnetic material comprises one or more finely divided ferromagnetic oxides.

4. A tag as claimed in claim 3, characterised in that the second magnetic material is a material with a coercivity in the range 100 to 6000 oersted.

5. A tag as claimed in claim 1, characterised in that the pattern of magnetisation applied to said second magnetic material is such that (i) the lengths of the magnetically discrete zones in said first magnetic material ("active regions") are constant and (ii) the lengths of said magnetised regions ("gaps") of said second material are varied to provide encoding of data.

6. A tag as claimed in claim 4, characterised in that the magnetisation of said second magnetic material (in said "gaps") is uniform when the length of a given "gap" is small in relation to the minimum length of an "active region" capable of being detected when the tag is read.

7. A tag as claimed in claim 4, characterised in that, when the length, $l_g$, of a given "gap" is of the same order as or is larger than the minimum length, $L_a$, of an "active region" capable of being detected when the tag is read, the magnetisation of said second magnetic material (in said "gaps") comprises a pattern of repeatedly reversing polarity, the spatial frequency of said pattern being such that the North and South poles thereof are spaced apart by a distance, d, which is less than $L_a$.

8. A tag as claimed in claim 7, characterised in that the distance d is less than $L_a/2$.

9. A tag as claimed in claim 7, characterised in that the magnetisation of said second magnetic material (in said "gaps") comprises a pattern of repeatedly reversing polarity in the form of a sine wave which begins and ends at a 90 degree phase point in the wave.

10. A tag as claimed in claim 1, characterised in that said second magnetic material is in the form of commercially available magnetic recording tape.

11. A method of encoding data in a magnetic tag of the type claimed in claim 1, which method is characterised by recording a magnetic pattern in selected regions of said second magnetic material, said magnetic pattern being in the form of an erasable pattern of repeatedly reversing polarity, said magnetisation being such as to couple magnetically with contiguous regions of said first magnetic material to magnetically divide the first magnetic material into a series of magnetically discrete zones, the length of said magnetically discrete zones and/or the lengths of said magnetised regions ("gaps") of said second material constituting elements of a code.

12. A method according to claim 11, characterised in that said magnetic pattern is recorded using a magnetic recording head.

13. A method according to claim 11, characterised in that said magnetic pattern is recorded using an array of closely spaced, parallel permanent magnets.

* * * * *

UNITED STATES PATENT AND TRADEMARK OFFICE
Certificate

Patent No. 6,204,766 B1

Patented: March 20, 2001

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Michael David Crossfield, Cambridge, Great Britain; Mark England, Milton, Great Britain; and Andrew Nicholas Dames, Cambridge, Great Britain.

Signed and Sealed this Nineteenth Day of November 2002.

JEFFERY A. HOFSASS
*Supervisory Patent Examiner*
Art Unit 2632